(12) United States Patent
Presley et al.

(10) Patent No.: US 11,620,039 B2
(45) Date of Patent: Apr. 4, 2023

(54) PERFORMANT CONFIGURATION USER INTERFACE

(71) Applicant: Builder Homesite, Inc., Austin, TX (US)

(72) Inventors: Kati Presley, Austin, TX (US); Nicole Lellis, Austin, TX (US); Alpana Arora, Austin, TX (US)

(73) Assignee: Builder Homesite, Inc., Austin, TX (US)

( * ) Notice: Subject to any disclaimer, the term of this patent is extended or adjusted under 35 U.S.C. 154(b) by 0 days.

(21) Appl. No.: 17/685,279

(22) Filed: Mar. 2, 2022

(65) Prior Publication Data
US 2022/0283699 A1 Sep. 8, 2022

Related U.S. Application Data

(60) Provisional application No. 63/155,419, filed on Mar. 2, 2021.

(51) Int. Cl.
*G06F 30/12* (2020.01)
*G06F 3/04845* (2022.01)
*G06T 5/00* (2006.01)

(52) U.S. Cl.
CPC .......... *G06F 3/04845* (2013.01); *G06F 30/12* (2020.01); *G06T 5/002* (2013.01); *G06F 2203/04803* (2013.01); *G06F 2203/04804* (2013.01); *G06T 2200/24* (2013.01); *G06T 2207/20192* (2013.01)

(58) Field of Classification Search
CPC ................. G06T 5/002; G06T 2200/24; G06T 2207/20192; G06T 2210/04; G06F 3/04845; G06F 30/12; G06F 2203/04803; G06F 2203/04804
See application file for complete search history.

(56) References Cited

U.S. PATENT DOCUMENTS

| | | | |
|---|---|---|---|
| 10,691,743 B2 * | 6/2020 | Sawhney | G06F 16/5838 |
| 10,713,854 B2 * | 7/2020 | McClendon | G06T 15/04 |
| 2010/0313110 A1 * | 12/2010 | Claridge | G06F 40/18 |
| | | | 715/801 |
| 2014/0157162 A1 * | 6/2014 | Chaudhri | G06F 3/0481 |
| | | | 715/768 |
| 2015/0178786 A1 * | 6/2015 | Claessens | G06Q 30/0277 |
| | | | 705/14.66 |
| 2016/0085436 A1 * | 3/2016 | Louch | G06F 3/04817 |
| | | | 715/790 |
| 2017/0178305 A1 * | 6/2017 | Silver | G06T 3/403 |
| 2021/0097768 A1 * | 4/2021 | Malia | G06F 3/04845 |

* cited by examiner

*Primary Examiner* — Antonio A Caschera
(74) *Attorney, Agent, or Firm* — Pillsbury Winthrop Shaw Pittman, LLP; Citad Hammerlind

(57) ABSTRACT

A process includes obtaining a set of images compositable to depict different design configurations; providing a first user interface by which members of the set are overlaid responsive to user inputs to depict different design configurations; obtaining a first design configuration specified via the first user interface; and providing a second user interface depicting a field of view having a first portion depicting the first design configuration and a second porting depicting a second design configuration, the second user interface being operative to adjust allocation in pixel space of the field of view between the first portion and the second portion responsive to user input.

20 Claims, 13 Drawing Sheets

PERFORMANT CONFIGURATION USER INTERFACE

CROSS-REFERENCE TO RELATED APPLICATIONS

This patent claims the benefit of U.S. Provisional Patent Application 63/155,419, filed 2 Mar. 2021, titled Performant Configuration User Interface. The entire content of this application is hereby incorporated by reference for all purposes.

BACKGROUND

1. Field

The present disclosure relates generally to user interfaces of computer systems and, more specifically, to performant configuration user interfaces used to configure products for build-to-order workflows.

2. Description of the Related Art

Many types of products are built-to-order, with the product design being specified by the buyer in advance. Often, buyers configure the product within some design space constrained by a menu of options. For example, homebuilders may offer a preset menu of options for countertops, flooring, cabinets, and fixtures, and before having a house built, a homebuyer may choose among these options to specify their design. Similar workflows are applied in other build-to-order offerings, like furniture, computers, clothing, landscaping, automobiles, and the like.

Often, the design space is relatively high dimensional and granular, which can make it difficult for users to effectively navigate among their options to arrive at a design they will ultimately prefer to other available designs. A design space for a house, for example, may have more than 10,000 or 100,000 different configurations that are possible with every permutation of surface material, fixture, layout, and the like that can be combined. Users generally do not want to, for example, view 10,000 images of a room to decide which they like best.

SUMMARY

The following is a non-exhaustive listing of some aspects of the present techniques. These and other aspects are described in the following disclosure.

Some aspects include a process including: obtaining a set of images compositable to depict different design configurations; providing a first user interface by which members of the set are overlaid responsive to user inputs to depict different design configurations; obtaining a first design configuration specified via the first user interface; and providing a second user interface depicting a field of view having a first portion depicting the first design configuration and a second portion depicting a second design configuration, the second user interface being operative to adjust allocation in pixel space of the field of view between the first portion and the second portion responsive to user input.

Some aspects include a tangible, non-transitory, machine-readable medium storing instructions that when executed by a data processing apparatus cause the data processing apparatus to perform operations including the above-mentioned process.

Some aspects include a system, including: one or more processors; and memory storing instructions that when executed by the processors cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
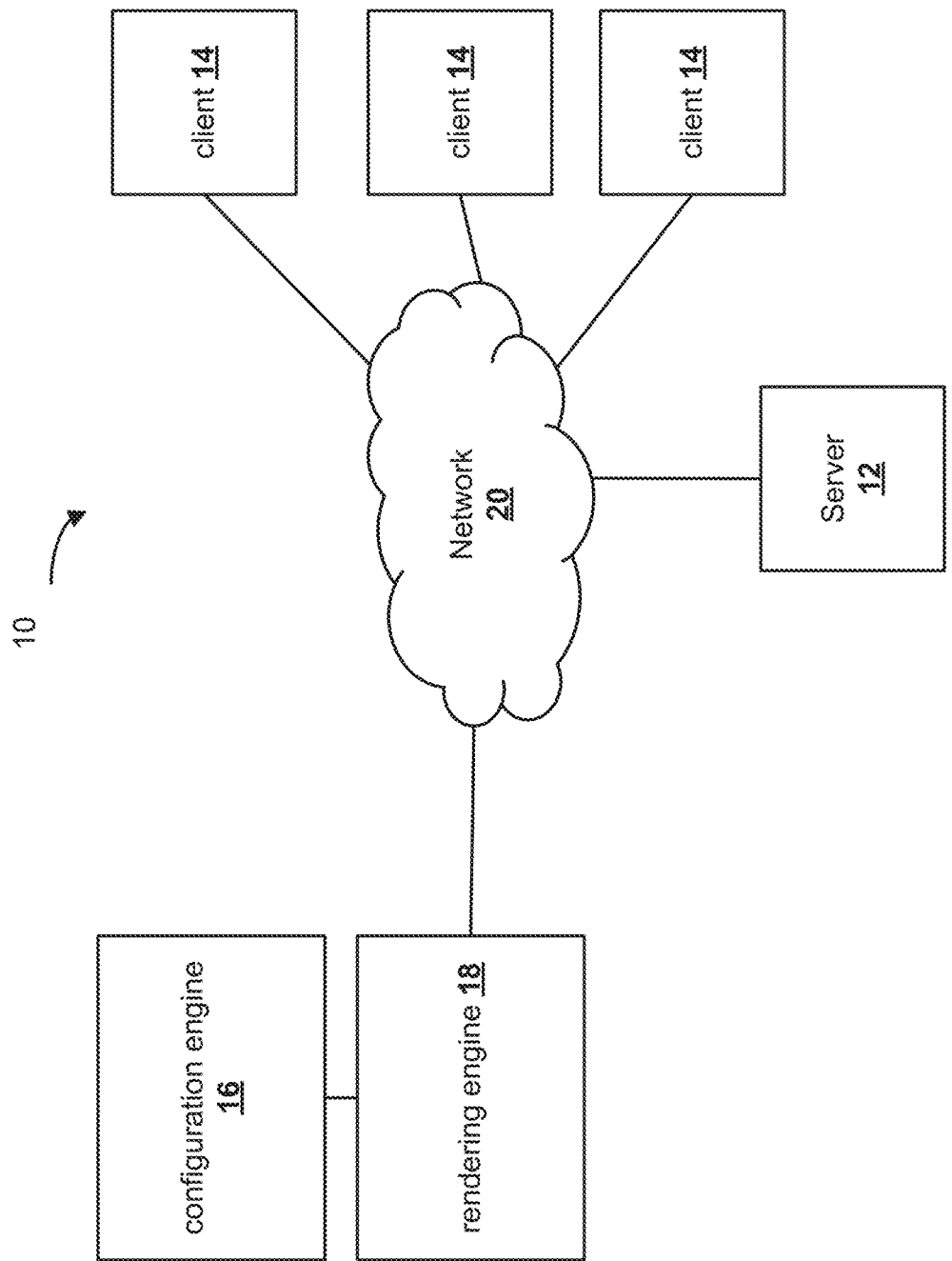
FIG. 1 illustrates a computing environment in which the present techniques may be implemented in some embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the fields of image processing and human-computer interaction. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

Some embodiments improve upon existing computer implemented tools to help users choose among their options and in build-to-order workflow. In particular, some embodiments implement a set of user interfaces that help users to quickly navigate a large, relatively high dimensional design space (e.g., as complicated or more complicated than those mentioned above) by improving the speed of the user's navigation through various windows and views. Some embodiments include two stages of user interfaces, with a first stage in which the user can dynamically adjust compositing of a stack of images to select various candidate designs, and a second stage in which the user can dynamically adjust which portions of a field-of-view depict one design or another, for instance by sliding a user interface element left and right or up and down, to dynamically adjust how much of the field-of-view depicts one design or the other on either side of a corresponding line adjusted with the sliding action.

Some embodiments may further substantially reduce memory computational complexity of design sessions with a data structure for images that scales favorably with the design space, e.g., a number of images needed to support operations may scale at a substantially lower rate than the number of supported designs in a design space. Some embodiments may implement compositing (e.g., alpha compositing) with techniques that reduce image artifacts near the edge of nontransparent portions of images in a stack. Some embodiments may reuse layers isolating given design options of given design elements across a relatively large number of designs involving those design elements and, in some cases, freeze a stack of layered images in a single flat image for use in the second stage user interface to afford relatively performant transitions. It should be emphasized, though, that embodiments are not limited to implementations affording all of these benefits, as various inventive aspects described can be used independently.

FIG. 1 illustrates an example of a computing environment 10 in which the present techniques may be implemented. In some embodiments, the computing environment 10 is a distributed computing environment implementing a client/server architecture, though other architectures are contemplated, including monolithic architectures executing on a single computing device. In some embodiments, the computing environment 10 includes a server 12, client computing devices 14, a configuration engine 16, a rendering engine 18, and a network 20, such as the Internet, by which these components may communicate.

In some embodiments, the client computing devices 14 are desktop computers, laptop computers, in-store kiosks, tablet computers, mobile phones, head-mounted displays, or the like, executing an operating system and a web browser or native application in which the described user interfaces are presented. Three client computing devices 14 are shown, but embodiments may support substantially more concurrent sessions, e.g., more than 100, or more than 1,000 geographically distributed sessions around the US or the world.

In some embodiments, the server 12 is a nonblocking web server or application program interface server configured to service multiple concurrent sessions with different client computing devices 14, for instance implementing a model-view-controller architecture or other design. In some embodiments, the server 12 may dynamically generate assets, markup language instructions, and scripting language instructions responsive to requests from client computing devices 14 to send user interfaces to, or update user interfaces on, those client computing devices 14. The user interface may evolve over time (e.g., in a web application), in some cases, displaying new resources (e.g., images and other data) sent from the server 12 responsive to user inputs to the user interface.

The configuration engine 16 and rendering engine 18 may be used to generate image files and metadata used by the server 12 to generate the user interfaces, for example supplying resources depicting and describing options in a design space.

Figure 2:
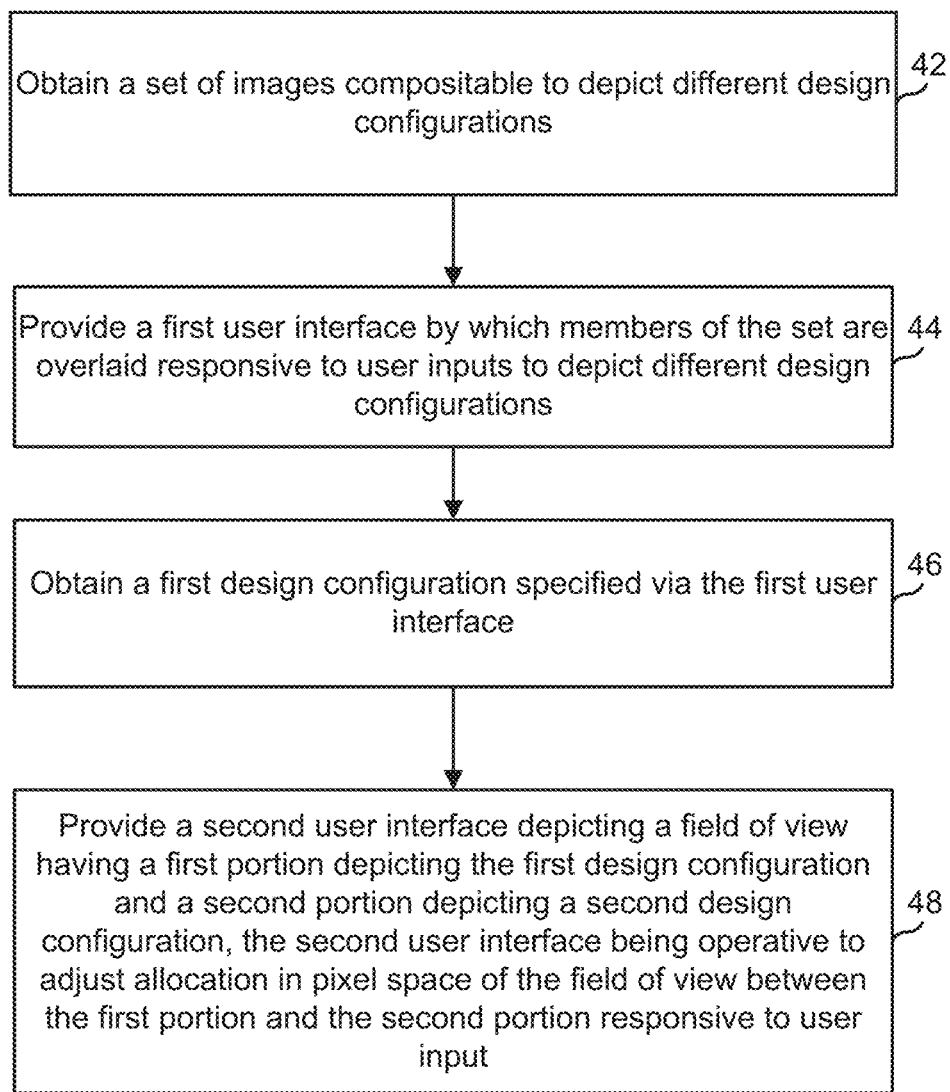
FIG. 2 illustrates a process by which the present techniques may be implemented in some embodiments.

In some embodiments, the server 12 may execute a process illustrated in FIG. 2, for example, by executing program code stored on a tangible, non-transitory, machine-readable medium. The illustrated operations may be executed in a different order, omitted, replicated, executed concurrently, executed serially, have additional operations inserted, all be automated, involve human intervention, or otherwise be modified relative to the arrangement depicted, which is not to suggest that any other description herein is limiting.

In some embodiments, the process 40 is preceded by one or more product manufacturers, which may be different tenants having different tenant accounts supported by the server 12, supplying a set of records characterizing a respective design space, among a plurality of design spaces. In some embodiments, the set of records may include computer aided design files specifying a spatial arrangement of a product to be manufactured, like a home, landscaping design, automobile, computer, furniture, or article of clothing. The set of records may further include various options for components, which may include different, substitutable computer-aided design (CAD) files for different shapes of components, like different fixtures, as well as different textures corresponding to different surfaces, like image files to be tiled over polygons that define a surface specified by the CAD files. In some embodiments, the records may furthering indicate which optional resources correspond to which surfaces or spatial areas of the CAD file. Options may further include lighting options, which may include attributes of the light to be used in renders.

In some embodiments, this set of records may be received by the above-described configuration engine 16, which may cooperate with the rendering engine 18 to provide data that allows the server 12 to obtain a set of images compositable to depict different designs in a design space, as indicated by block 42 in FIG. 2. In some embodiments, the set of images may include substantially fewer images than there are possible designs supported in the design space. For example, the number of images may scale at a rate of less than some coefficient of the number of designs supported by a specified design space corresponding to the set of images, or the design space may have a number of designs that scales at an exponential rate relative to the number of injured images needed to depict all of the designs in that space or a lower rate. As a result, some embodiments may substantially reduce the computational complexity of the described operations in terms of memory complexity relative to more naïve approaches that obtain a different image for every single possible design in a design space. That said, embodiments are also consistent with this more naïve approach in some cases, for example, where the design spaces relatively low dimensional and coarse-grained.

In some embodiments, the set of images may include images like those described below in a technical description of an example embodiment having in-line images. In some embodiments, the set of images may include a base image depicting a field-of-view of the article of manufacture, or portion thereof, like a view into a kitchen of a house or commercial property to be designed, or into an automobile interior, or of a model wearing article of clothing. In some embodiments, the base image may have no transparency in the entire image or a portion depicting the field-of-view. In some embodiments, the base image is a three-dimensional perspective view of the field-of-view. In some cases, the rendering engine may execute a ray-tracing algorithm to render the images, in some cases, masking or isolating given objects to create the templates described below.

In some embodiments, the set of images include template images to be overlaid on the base image to depict different design options. For example, the base image may depict a countertop with a blue surface, and a template image may include a view of that countertop with a green surface, both having the pixels depicting the countertop in the same positions in pixel space (e.g., at the same Cartesian coordinates in the image). In some embodiments, the template images may include a first portion with pixel values that are nontransparent and overlay and occlude pixels in the base image to depict the design option. The template images may further include a second portion with pixels that are transparent, such that when overlaid on the base image, the pixels of the base image are still viewable. The transparent pixels in need not be perfectly transparent to qualify as such, provided the visual effect of the base image or other layered images remains for the viewer. For example, the transparent pixels may be less than more than 80% transparent, 90% transparent, 95% transparent, 99% transparent, or 99.9% transparent while still qualifying as "transparent."

In some embodiments, the images in the set may be in a format that supports transparency, for example portable network graphics (PNG) format, joint photographic experts group extended range (JPEG XR) format, WebP format, or the like. In some embodiments, the image file format may include an alpha channel, separate from, for example, red, blue, and green channels that specify intensities for each of several colors constituting the pixel. In some embodiments, the alpha channel may specify transparency of the corresponding pixel at the coordinates of that pixel, like Cartesian coordinates of height and width. In some embodiments, the alpha channel may have a bit depth of 4, 8, 16, or 32 bits, or more or less corresponding to different degrees of transparency. In some embodiments, the image format may be a lossy compression format or a lossless compression format, depending upon design trade-offs in image quality, latency, and bandwidth consumption. Some embodiments may compress the image by segmenting it into square blocks, computing a discrete wavelet transform (e.g., with a fast Fourier transform) of various spatial variation of pixel intensity in the channel within each block, quantizing the resulting matrix by multiplying it with a quantization matrix tuned to down-res higher frequency components, and then compressing the result with run-length coding or dictionary coding. The client computing device may reverse this process with a suitable image decoder to determine pixel intensities and display the image, thereby conserving memory, bandwidth, and latency.

In some embodiments, each of the images in the set may have the same height and width in pixel space, such that when the images are overlaid, the position of the second portion in the template images is at a specified portion of the first portion, for instance causing an overlay of a countertop surface design choice to be in the proper position. Or in some cases, template images may be smaller and may include a height and width offset that specifies an alignment point for overlay.

In some embodiments, the template images are associated with a depth value, like an integer depth value, such as a z value, and template images may be applied to a base image in a stack according to these depth values, monotonically increasing or decreasing, depending upon the numbering scheme. This is expected to accommodate scenes in which portions affected by different design options overlie one another in the field-of-view.

In some embodiments, the images in the set may be created by the rendering engine 18 in cooperation with the configuration engine 16. In some embodiments, the configuration engine 16 may execute a script that causes the configuration engine 16 to generate polygon volumetric meshes and surface tiling of every permutation of supported design and provide those outputs to the rendering engine 18 to cause the rendering engine 18 to render corresponding images. In some embodiments, the rendering engine 18 (e.g., Unreal Engine from Epic Games Inc. of Cary, N.C.) may be directed to generate a single base image for each three-dimensional polygon mesh and then generate template images for all options of textures that are supported in the design space. In some embodiments, this process may be repeated for multiple sets corresponding to different views of different portions of the product, and the operations described may be replicated for those different views. For example, a user may configure their kitchen in one set of user interfaces and their bathroom in another. In some embodiments, the images may be generated in advance of a session with the user with preprocessing, as image generation may be relatively computationally complex and time-consuming, possibly taking more than 10 minutes or 10 hours to cover all permutations of a design space. Or some embodiments may implement real-time server-side or client-side rendering, e.g., when the design space is particularly high dimensional and complex. The resulting images may be indexed according to the design options to which they correspond, and the configuration engine 16 may provide an ontology of those options along with the corresponding images to the server 12, which may store them in a repository for use when generating user interfaces in subsequent steps.

In some embodiments, the rendering engine 18 may be operative to perform certain operations to reduce edge artifacts in template images to improve the visual quality of composite images in which those templates are stacked on a base image, in some cases with multiple (3, 5, 10, or more) such template images stacked. In some embodiments, the rendering engine 18 may implement alpha compositing with those template images. In some embodiments, the rendering engine or associated raster graphics editor, may apply a Gaussian blur on the alpha channel of the template images (e.g., only the alpha channel and not in the other channels), for example a five pixel by five pixel Gaussian kernel, a three pixel by three pixel Gaussian kernel, or different size Gaussian kernel for a convolution may be applied to the alpha channel but not other channels, in some cases. In some embodiments, the transformation may be performed after converting the initial images from a non-linear color space, like sRGB, to a linear color space, and then after the transformation to smooth edges in the alpha channel, the images may be converted back to a non-linear color space. In some embodiments, the alpha channel may be a straight unassociated alpha channel or a pre-multiplied associate alpha channel. In some embodiments, these operations may result in a gradient of transparency at edges of the first portions of the template images, which are expected to reduce artifacts at edges, like ugly jagged lines and discordant color transitions in composite images displayed in client-side user interfaces. In some embodiments, the rendering engine 18 may include or may communicate with a raster graphics editor program, such as one scripted to implement these transformations or instructed implement these transformations through system calls, like Gimp or ImageMagick. Or some embodiments may implement compositing without adjusting the alpha channel, which is not to suggest that any other description is limiting.

In some embodiments, the process 40 further includes providing a first user interface by which members of the set are overlaid responsive to user inputs to depict different design configurations, as indicated by block 44. In some embodiments, this operation may be performed by the server 12 by sending markup styling and scripting what language instructions to the client device 14 responsive to a request for such a user interface (e.g., one including a user identifier by which the session may be associated with a profile), along with corresponding visual assets and data used to effectuate different views to be presented responsive to user inputs. In some embodiments, this transmission may be responsive to a request for a specific view or product from the one of the client devices 14, for example, via a web browser or native application. In some embodiments, the user interface may be provided by sending assets and data to a native application otherwise having code and other instructions needed to populate the user interface.

In some embodiments, providing the user interface may include sending images that are not immediately displayed to hold in a client-side cache to afford a relatively responsive updates to the user interface after user inputs. For example, some embodiments may send a subset of template images selected based upon a user's profile that are predicted to be likely to be chosen or were previously designated as "favorites." In some embodiments, the user interface may take the form of that shown below in the appended technical documentation. In some embodiments, this first user interface may include inputs by which a user selects which design element is to be configured and inputs by which the user selects among options for that design element, for instance, by clicking, touching, or voicing spoken instructions to make selections. In some embodiments, user interfaces may be presented in virtual reality or augmented reality with a head-mounted display, and inputs may be implemented with gaze tracking or pointing. User inputs may be mapped to event handlers that update the user interface by manipulating a document object model to reflect the user's selection and update program state, e.g., swapping in and out template images in a stack of such images overlaying a base image to reflect user design choices.

In some embodiments, the first user interface executing on the client device may present these options and receive inputs from the user to select among them. Responsive to receiving a user selection of a given design option, the first user interface may access from cache or request from the server 12 a corresponding template image depicting the user selection (e.g., a given design option). The user interface may, upon receiving that image or accessing that image, determine a position in a stack of images currently composited in the user interface to receive the newly selected template image, based upon a depth value of the image and depth values of the other images in the stack, maintaining the stacked images in depth order in a composite view. In some embodiments, the images may be stacked in a div box in a document object model with which the user interface is implemented in a web browser. In some embodiments, the images that are stacked may have their position attributes set to absolute to control alignment as, for example, the screen is resized.

In some embodiments, the user interface may maintain a design state record for the session, which in some cases may be saved to a user profile server-side or client-side, so that the current state of the user interface may be re-created by, for example, replaying a set of user selections in a log, or stacking the specified template images for a design recorded in the profile. In some embodiments, the user interfaces may include an input by which a user may save their design or name their design.

In some embodiments, upon naming or otherwise designating a design, the stacked set of images may be flattened into a flat, single image of the design, which may be stored in memory in association with the user's profile (e.g., in client-side cache or server-side). In some embodiments, a design image may be named according to the response of a hash function to a text specification of the existing design, such that identical designs are assigned the same hash value as a name, and duplicate instances of the same design selected by different consumers may be maintained in memory with a single image file server side to save memory. In some embodiments, the flattening of the image may be performed server-side with the above-described image raster graphics editors, or some embodiments may flatten the image client-side, for example, by invoking WebGL functionality to expedite image processing operations via the browser by concurrently combining pixel values in a stack in different regions with different pixel shaders of a graphics processing unit (GPU) of the client 14.

In some embodiments, as a result of the user designating a design, some embodiments of the server 12 may obtain a first design configuration specified via the first user interface, as indicated by block 46. The specification may include identifiers of the images stacked in the design, a log of user edits to the design from the base design, or an inventory of design elements chosen in the design, for example. In some embodiments, this design configuration may be stored along with a plurality of other design configurations chosen by the user. In some embodiments, the server 12 may further store in memory a set of public design configurations (also referred to as designs), for example, chosen by interior design specialists or architects or other experts in the design domain, and users may also access these to compare against their own configurations or to compare configurations of designs from different preset alternatives.

Some embodiments may then provide a second user interface depicting a field of view having a first portion depicting the first design configuration and a second portion depicting a second design configuration, as indicated by block 48. In some embodiments, the second user interface is operative to adjust allocation in pixel space of the field-of-view between the first portion and the second portion responsive the user input. For example, in some cases the second user interface may include a user interface element, like a clickable, touchable, or otherwise draggable region that bisects the image and can be slid left and right or up and down (or along some other path), causing two different designs to be depicted in the same view on either side of the line, as the line is moved to show more or less of one designer the other.

Other examples include user interfaces that cause one designed to fade into the other, for example by stacking the two designs and adjusting transparency of one designer the other. In some cases, the user interface may include a circular or rectangular "lens" or other region that can be moved around the field-of-view to show a different design from that depicted in the view surrounding the lens. In some embodiments, individual design elements are selectable, like touchable, clickable, or the like, to transition between different options in the different designs. In some embodiments, two designs may be compared with the second user interface, three designs may be compared to the second user interface (for example with multiple lens user interfaces), or more designs may be compared.

In some embodiments, in the second user interface, the flattened versions of the images depicting the designs are used to expedite the transition between designs, to keep the user interface responsive, or some embodiments may maintain the stacked composited images from the first user interface in the second user interface, and implement the same visual adjustment by manipulating which spatial portions of the stacks are depicted responsive to user interface inputs. Or some embodiments may toggle which layers are depicted using similar techniques.

In some embodiments, the second user interface may include scripting language (or WebAssembly) instructions that map an event handler to an element in a document object model of the user interface that corresponds to user input to make the adjustment of block 48. Examples include a div box, button, or the like. In some embodiments, the user interface element is updated in its position in the window responsive to user input, such that the user interface element appears to be animated sliding along with the user's touch. In some embodiments, the element may snap to positions corresponding to predefined granular adjustments in the view. In some embodiments, the event handler may cause a subroutine to be executed that updates which portions of the images depicting the first and second view design configurations are visible. For example, some embodiments may stack images of the different designs in a div box in the document object model with position attributes set to absolute, and as a slider is adjusted, touch release, on touch, or touch drag events (or corresponding mouse or gaze events) may trigger an event handler mapped to the corresponding user interface element, and that event handler may cause scripts to be executed to dynamically update which portions of the images of the different designs are visible by modulating the clip-path property in cascading style sheets specifications mapped to the images in the div box. Or some embodiments may adjust cropping of images in a canvas element. In some embodiments, these updates to the document object model may be mediated through a shadow document object model using a framework or library like React, Vue, or Angular to make transition smoother and consolidate collections of transitions similar to one another in time to reduce the processing workload for the browser's rendering engine.

In some embodiments, these techniques may be implemented to present user interfaces like those described in FIGS. 3A-3J that illustrate an embodiment in an example use case. In some embodiments, upon selecting a design, user's may be routed to a server of a product manufacturer, e.g., with URL having a query string that specifies the design, and the user may purchase the product and have it built according to specification.

Figure 3A:
FIG. 3A illustrates a user interface in which the present techniques may be implemented in some embodiments.

FIGS. 3A-3D and FIGS. 4A-4F illustrate an example use case of the techniques, described above, to present user interfaces 300a-300d and 400a-40f, respectively on a display screen 302/402 included on a client 14 of FIG. 1. FIG. 3A illustrates the user interface 300a. The user interface 300a may include a base image 304. As described above, the base image may depict a field-of-view of the article of manufacture, or portion thereof, like a view into a kitchen of a house or commercial property to be designed, or into an automobile interior, or of a model wearing an article of clothing. The base image may include a base division (div) hypertext markup language (HTML) element with a background image to present an initial scene.

Figure 3B:
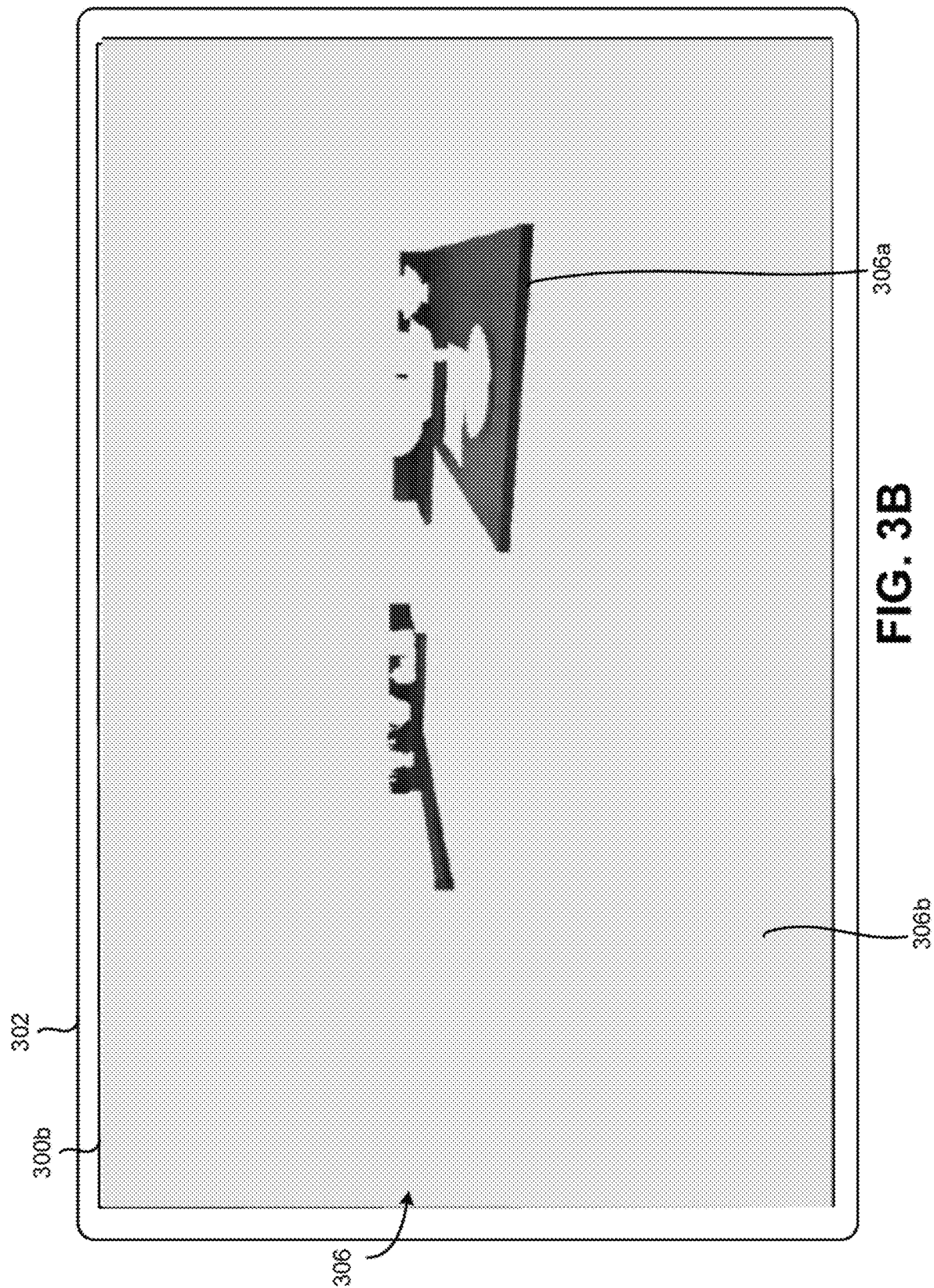
FIG. 3B illustrates the user interface in which the present techniques may be implemented in some embodiments.

FIG. 3B illustrates the user interface 300b. Inside the base div HTML, additional div elements may be added with full width and height to show layers. As such, user interface 300b may include a template image 306. As discussed above, template images may be overlaid on the base image to depict different design options. For example, the base image may depict a countertop with a blue surface, and the template image 306 may include a view of that countertop with a green surface, both having the pixels depicting the countertop in the same positions in pixel space (e.g., at the same Cartesian coordinates in the image). In some embodiments, the template image 306 may include a first portion 306a with pixel values that are nontransparent and overlay and occlude pixels in the base image to depict the design option. The template image 306 may further include a second portion 306b with pixels that are transparent, such that when overlaid on the base image, the pixels of the base image are still viewable.

Figure 3C:
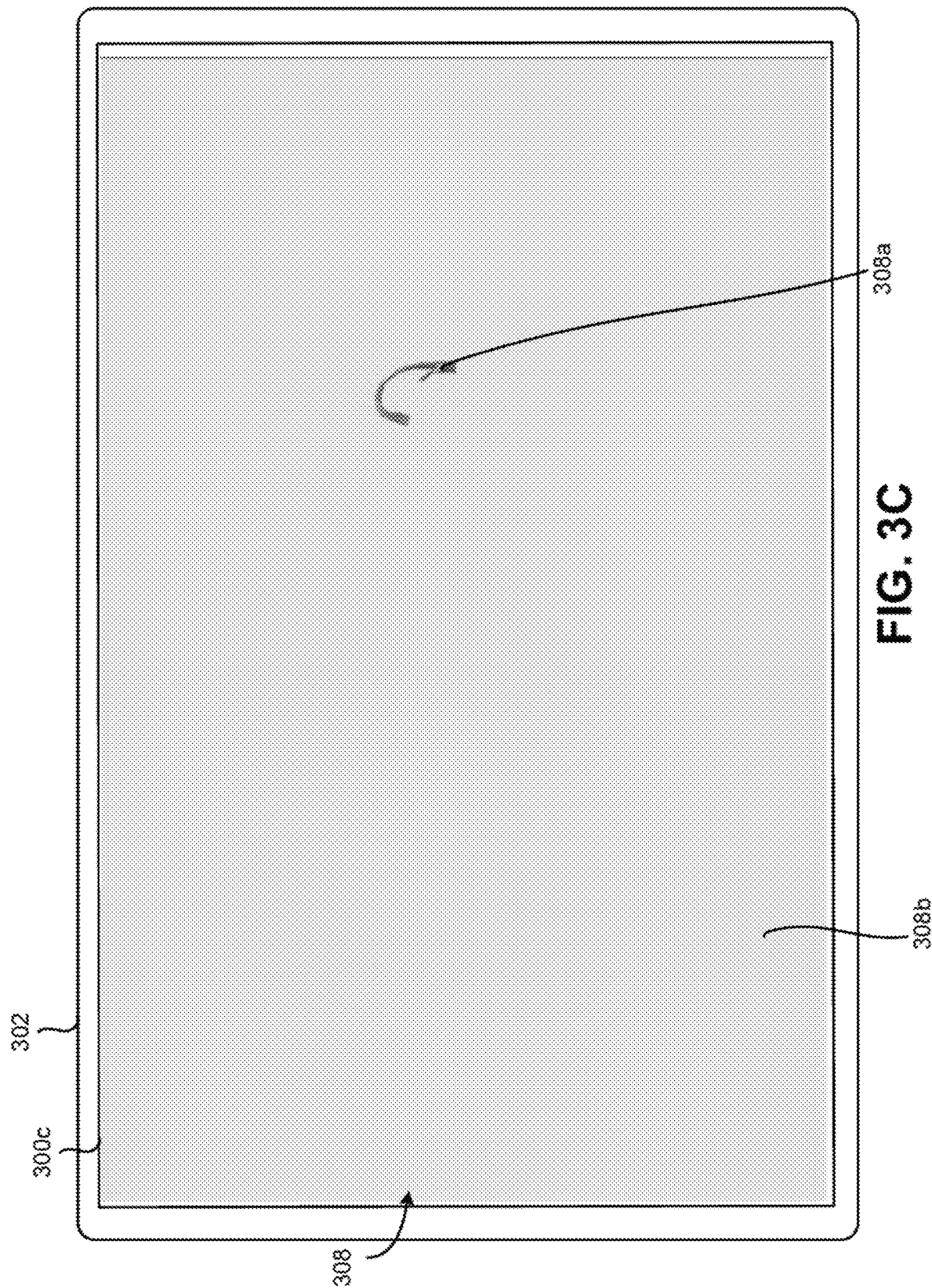
FIG. 3C illustrates a user interface in which the present techniques may be implemented in some embodiments.

FIG. 3C illustrates the user interface 300c. The user interface 300c may include a template image 308. The template image 308 may include a first portion 308a with pixel values that are nontransparent. As illustrated, the first portion 308a includes an image of a facet. The template image 308 may include a second portion 308b with pixels that are transparent.

Figure 3D:
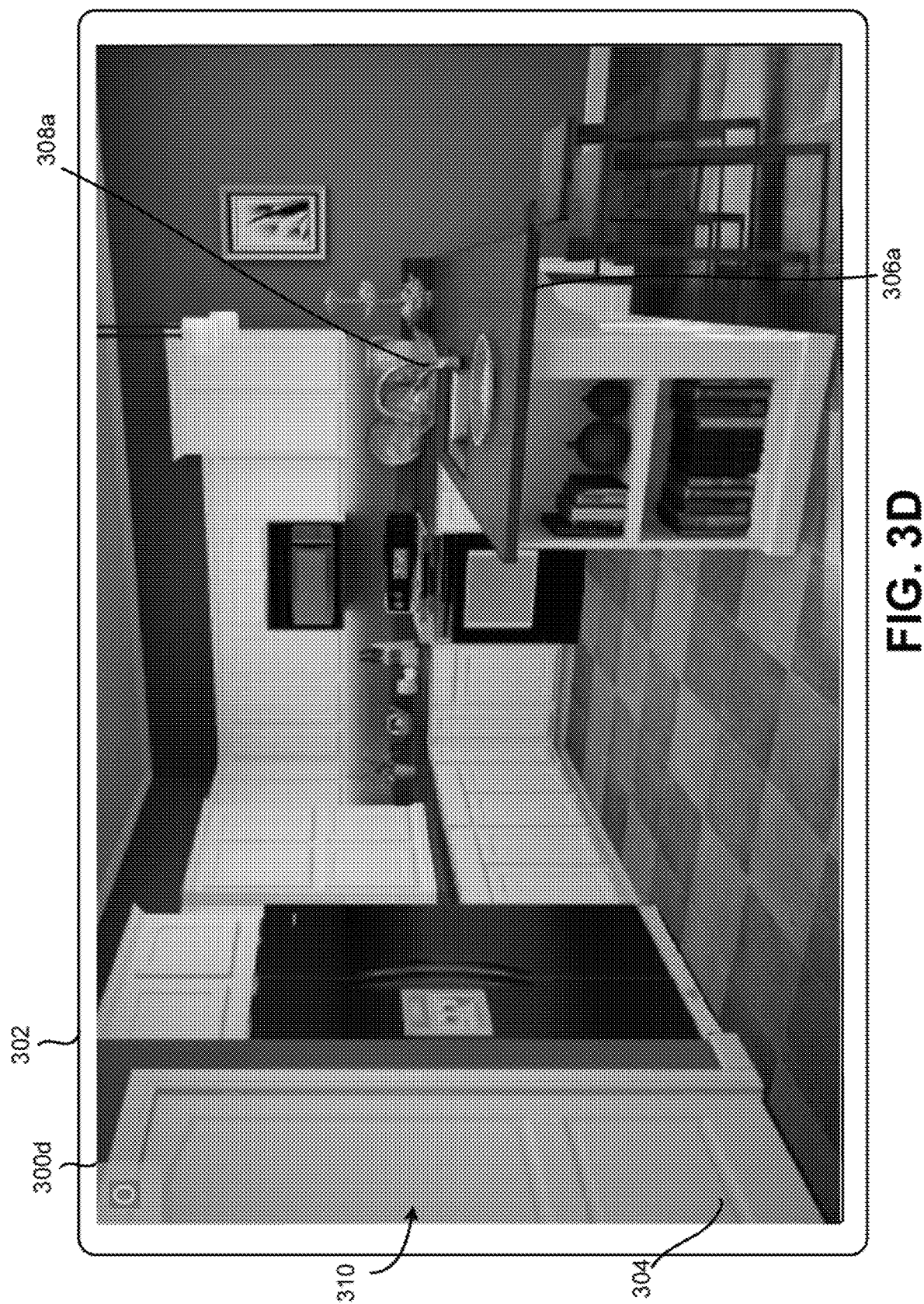
FIG. 3D illustrates a user interface in which the present techniques may be implemented in some embodiments.

FIG. 3D illustrates the user interface 300d. The user interface 300d may include a composite image 310 that includes a stack of the template images 306 and 308 and the base image 306. As can be seen from FIG. 3D, the countertop 306a, illustrated in FIG. 3B, and the facet 308b, illustrated in FIG. 3C, are now stacked on the base image 304 to form the composite image 310.

Figure 4A:
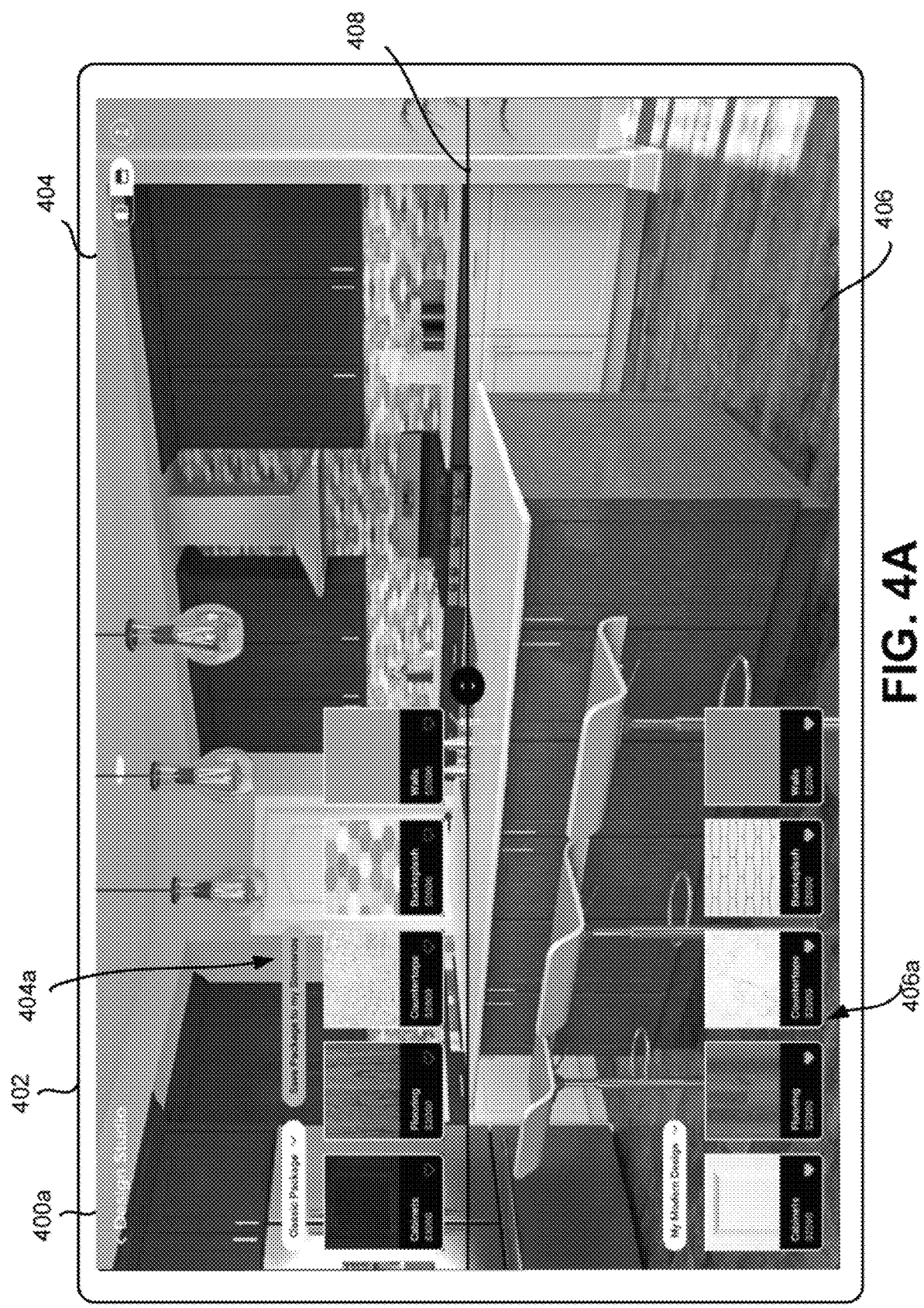
FIG. 4A illustrates a user interface in which the present techniques may be implemented in some embodiments.
Figure 4B:
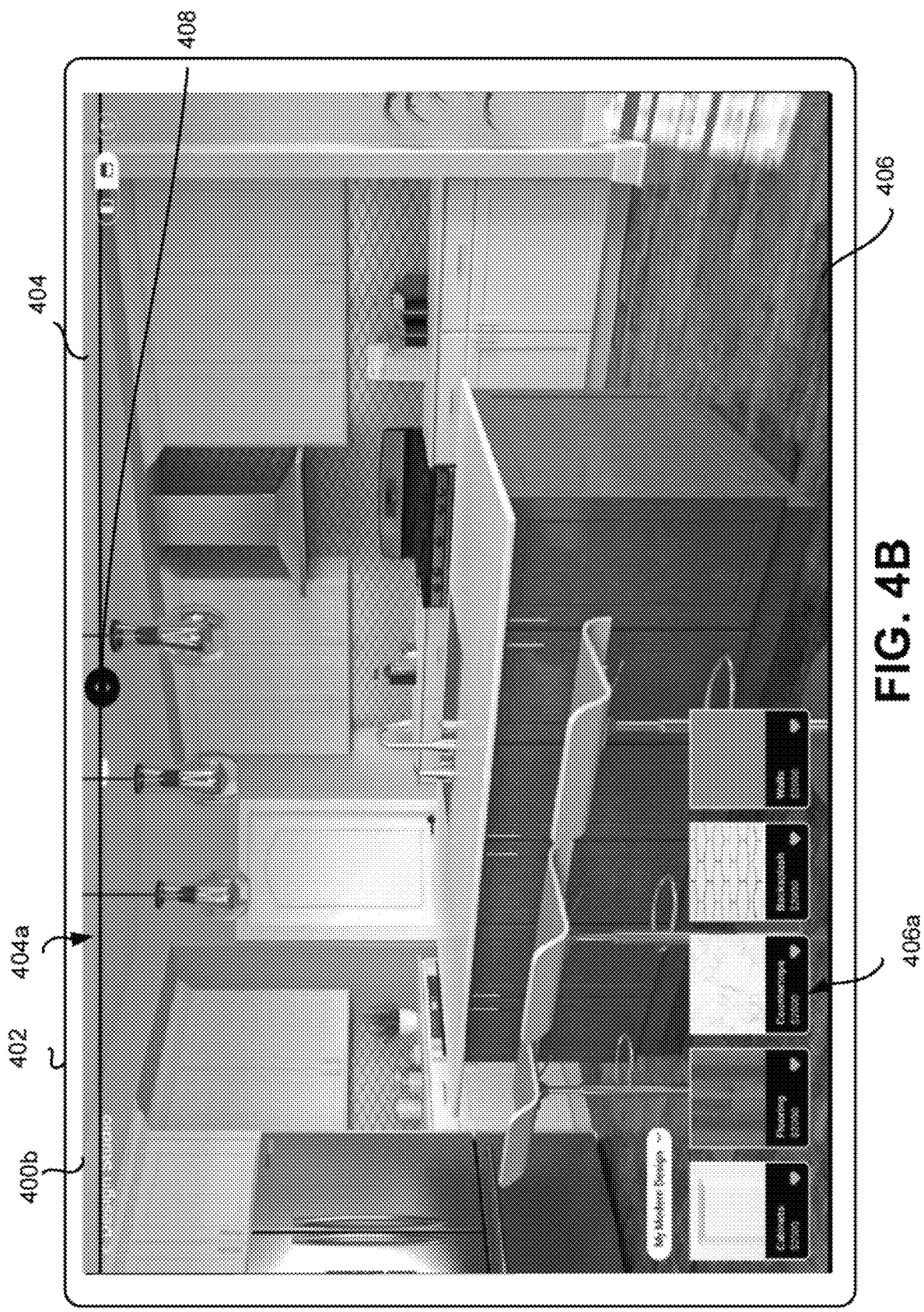
FIG. 4B illustrates the user interface in which the present techniques may be implemented in some embodiments.
Figure 4C:
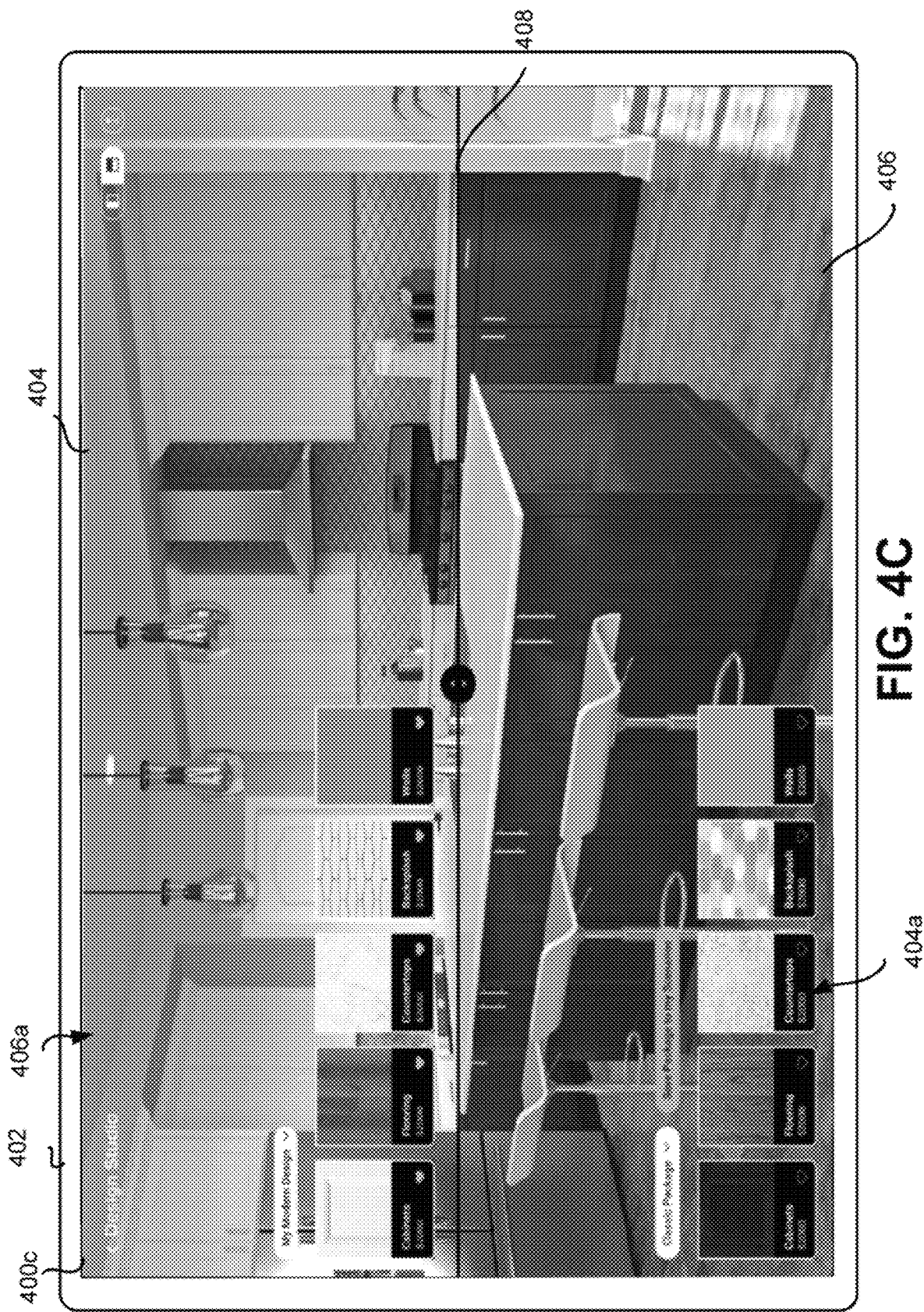
FIG. 4C illustrates a user interface in which the present techniques may be implemented in some embodiments.

FIGS. 4A-4F illustrate presented user interfaces 400a-400g on a display screen 402 include on a client 14 of FIG. 1. In FIG. 4A, the user interface 400a depicts a field of view 403 having a first portion 404 depicting a first design configuration 404a and a second portion 406 depicting a second design configuration 406a, as discussed above with respect to block 48. In some embodiments, the user interface 400a is operative to adjust allocation in pixel space of the field-of-view between the first portion 404 and the second portion 406 responsive the user input. For example, in some cases the user interface 400a may include a user interface element 408, like a clickable, touchable, or otherwise draggable region that bisects the image and can be slid left and right or up and down (or along some other path), causing two different designs to be depicted in the same view on either side of the line, as the line is moved to show more or less of one designer the other. For example, FIG. 4B illustrates the user interface element 408 moved to the top of the display such that primarily the second portion 406 is viewed on the user interface 400b such that the second design configuration 406a may be presented. FIG. 4C illustrates the user interface 400c where the first design configuration 404a and the second design configuration 406a are swapped such that the first portion 404 of the field of view 403 may present the second design configuration 406a and the second portion 406 of the field of view may present the first design configuration 404a.

Figure 4D:
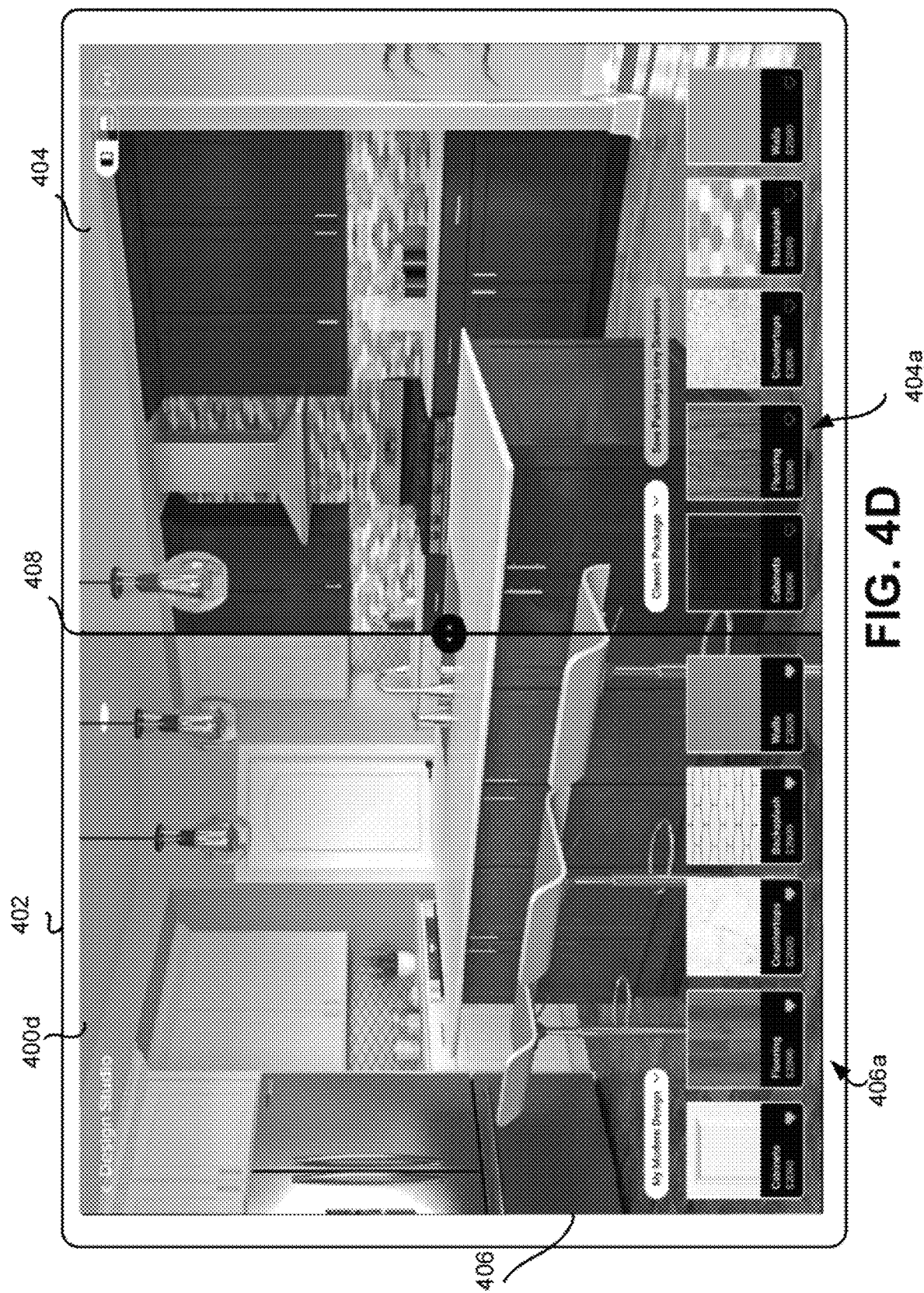
FIG. 4D illustrates a user interface in which the present techniques may be implemented in some embodiments.
Figure 4E:
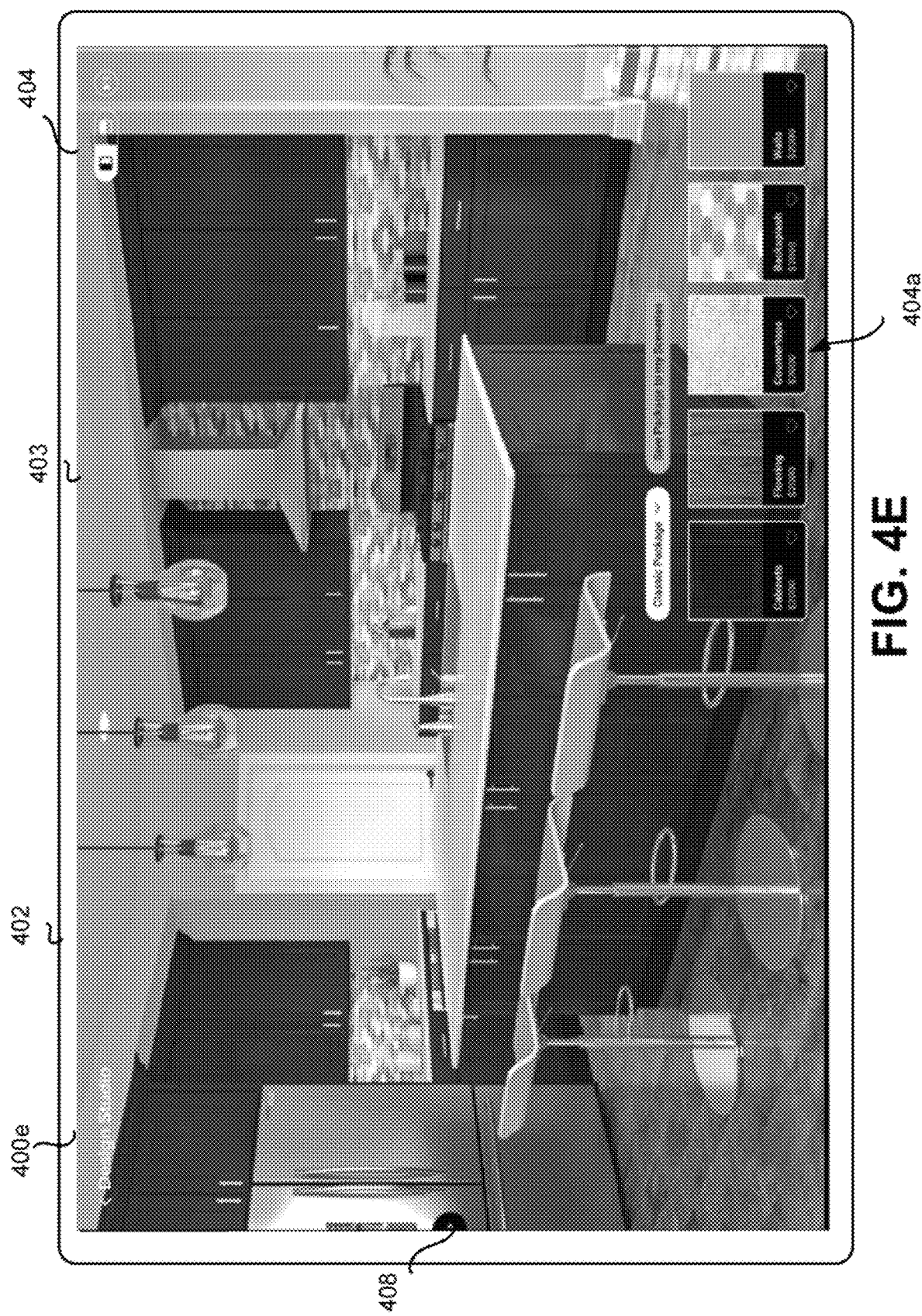
FIG. 4E illustrates a user interface in which the present techniques may be implemented in some embodiments.
Figure 4F:
FIG. 4F illustrates a user interface in which the present techniques may be implemented in some embodiments.

In FIG. 4D, the user may have selected that the user interface element 408 is positioned in a vertical orientation rather than a horizontal orientation as illustrated in FIGS. 4A-4C. As such, the user interface 400d depicts a field of view 403 having a first portion 404 depicting a first design configuration 404a and a second portion 406 depicting a second design configuration 406a. FIG. 4E illustrates the user interface element 408 moved to the left of the user interface 400e such that primarily the first portion 404 is viewed on the user interface 400e or that the first design configuration 404a may be presented. FIG. 4F illustrates the user interface 400f where the first design configuration 404a and the second design configuration 406a are swapped such that the first portion 404 of the field of view 403 may presented by the second design configuration 406a and the second portion 406 of the field of view may present the first design configuration 404a.

Figure 5:
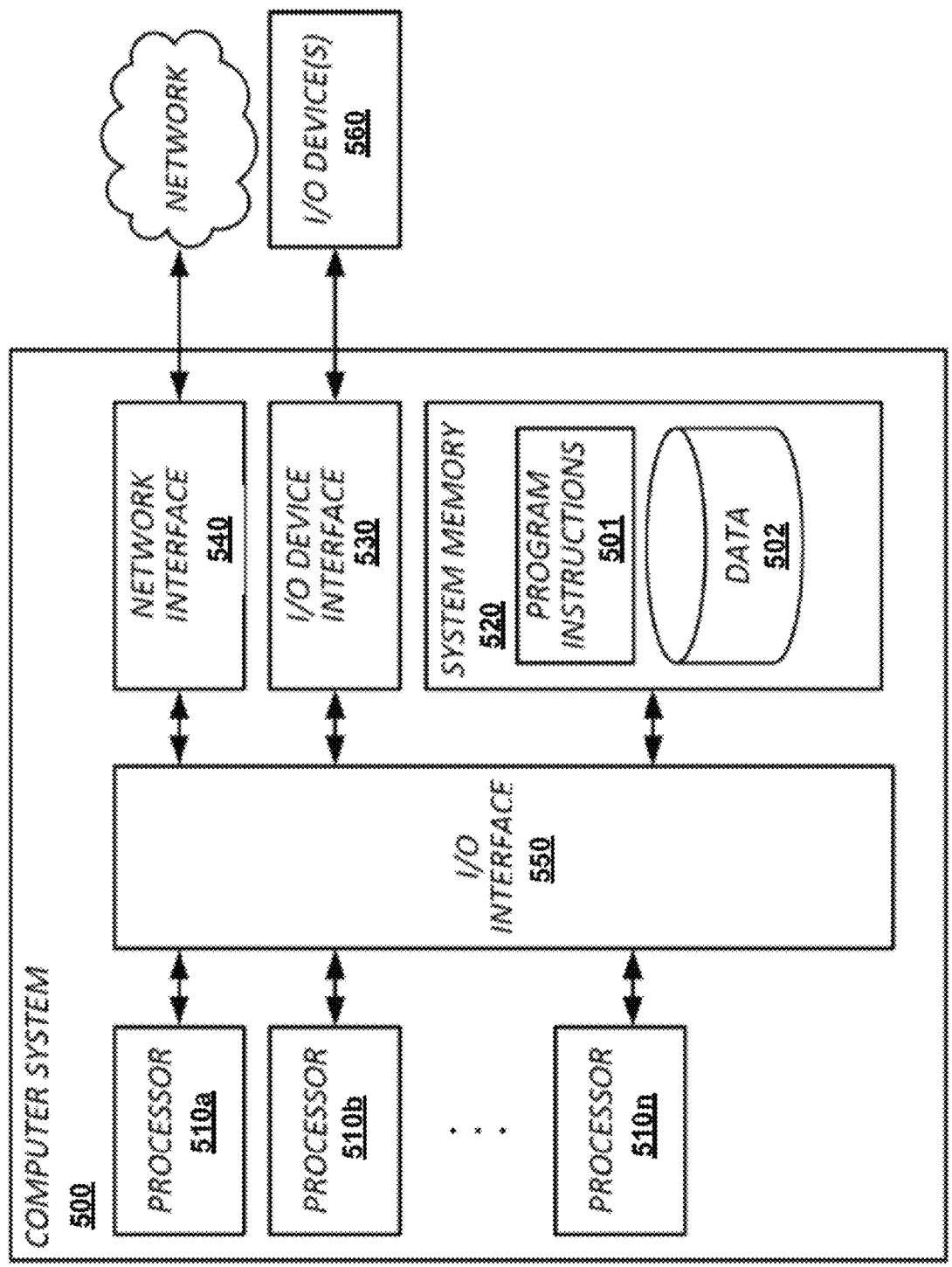
FIG. 5 illustrates an example computing device by which the present techniques may be implemented in some embodiments.

FIG. 5 is a diagram that illustrates an exemplary computing system 500 in accordance with embodiments of the present technique. Various portions of systems and methods described herein, may include or be executed on one or more computer systems similar to computing system 500. Further, processes and modules described herein may be executed by one or more processing systems similar to that of computing system 500.

Computing system 500 may include one or more processors (e.g., processors 510a-510n) coupled to system memory 520, an input/output I/O device interface 530, and a network interface 540 via an input/output (I/O) interface 550. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 500. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 520). Computing system 500 may be a uni-processor system including one processor (e.g., processor 510a), or a multi-processor system including any number of suitable processors (e.g., 510a-510n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 500 may include a plurality of computing devices (e.g., distributed computer systems) to implement various processing functions.

I/O device interface 530 may provide an interface for connection of one or more I/O devices 560 to computer system 500. I/O devices may include devices that receive input (e.g., from a user) or output information (e.g., to a user). I/O devices 560 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 560 may be connected to computer system 500 through a wired or wireless connection. I/O devices 560 may be connected to computer system 500 from a remote location. I/O devices 560 located on remote computer system, for example, may be connected to computer system 500 via a network and network interface 540.

Network interface 540 may include a network adapter that provides for connection of computer system 500 to a network. Network interface may 540 may facilitate data exchange between computer system 500 and other devices connected to the network. Network interface 540 may support wired or wireless communication. The network may include an electronic communication network, such as the Internet, a local area network (LAN), a wide area network (WAN), a cellular communications network, or the like.

System memory 520 may be configured to store program instructions 501 or data 502. Program instructions 501 may be executable by a processor (e.g., one or more of processors 510a-510n) to implement one or more embodiments of the present techniques. Instructions 501 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 520 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 520 may include a non-transitory computer readable storage medium that may have program instructions stored thereon that are executable by a computer processor (e.g., one or more of processors 510a-510n) to cause the subject matter and the functional operations described herein. A memory (e.g., system memory 520) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 550 may be configured to coordinate I/O traffic between processors 510a-510n, system memory 520, network interface 540, I/O devices 560, and/or other peripheral devices. I/O interface 550 may perform protocol, timing, or other data transformations to convert data signals from one component (e.g., system memory 520) into a format suitable for use by another component (e.g., processors 510a-510n). I/O interface 550 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 500 or multiple computer systems 500 configured to host different portions or instances of embodiments. Multiple computer systems 500 may provide for parallel or sequential processing/execution of one or more portions of the techniques described herein.

Those skilled in the art will appreciate that computer system 500 is merely illustrative and is not intended to limit the scope of the techniques described herein. Computer system 500 may include any combination of devices or software that may perform or otherwise provide for the performance of the techniques described herein. For example, computer system 500 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 500 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text; images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call. To the extent bespoke noun phrases (and other coined terms) are used in the claims and lack a self-evident construction, the definition of such phrases may be recited in the claim itself, in which case, the use of such bespoke noun phrases should not be taken as invitation to impart additional limitations by looking to the specification or extrinsic evidence.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A tangible, non-transitory, machine-readable medium storing instructions that when executed by one or more processors effectuate operations comprising: obtaining, with a computer system, a set of images compositable to depict different design configurations; providing, with the computer system, a first user interface by which members of the set are overlaid responsive to user inputs to depict different design configurations; obtaining, with the computer system, a first design configuration specified via the first user interface; and providing, with the computer system, a second user interface depicting a field of view having a first portion depicting the first design configuration and a second portion depicting a second design configuration, the second user interface being operative to adjust allocation in pixel space of the field of view between the first portion and the second portion responsive to user input.

2. The medium of embodiment 1, wherein the set of images includes a base image and at least one template image overlaid on top of the base image.

3. The medium of embodiment 2, wherein the base image depicts a field of view of at least a portion of an article of manufacture.

4. The medium of embodiment 2, wherein the at least one template image includes a first portion with pixels that are transparent such that, when overlaid on the base image, the pixels of the base image are still viewable, and wherein the at least one template image includes a second portion with pixels that are nontransparent and provide a design option for the first design configuration or the second design configuration such that, when overlaid on the base image, the pixels of the second portion occlude and overlay pixels in the base image to depict the design option.

5. The medium of embodiment 2, wherein a template image of the at least one template image includes a depth value that indicates a position of the template image in a stack of template images.

6. The medium of embodiment 2, wherein the base image and the at least one template image are stacked in a div box in a document object model.

7. The medium of embodiment 2, wherein the operations include steps for reducing edge artifacts in the at least one template image.

8. The medium of embodiment 1, wherein the second user interface includes a user interface element that splits the second user interface and is slidable to adjust the allocation in pixel space of the field of view between the first portion and the second portion responsive to the user input.

9. The medium of embodiment 8, wherein the user interface element is presented as animated sliding.

10. The medium of embodiment 8, wherein the user interface element is presented with an animated snap to a position corresponding to a predefined granular adjustment.

11. The medium of embodiment 1, wherein the adjusting the field of view between the first portion and the second portion responsive to the user input includes fading the first portion into the second portion by adjusting a transparency of the first portion.

12. The medium of embodiment 1, wherein the adjusting the field of view between the first portion and the second portion responsive to the user input includes a region that is movable by the user input such that the first portion is presented in the region and the second portion is presented outside the region.

13. The medium of embodiment 1, wherein second user interface includes scripting language instructions that map an event handler to an element in a document object model of the second user interface that corresponds to the user input to make the adjustment.

14. The medium of embodiment 1, wherein the operations comprise steps for adjust allocation in pixel space of the field of view between the first portion and the second portion responsive to user input.

15. A tangible, non-transitory, machine-readable medium storing instructions that when executed by one or more processors effectuate operations comprising: obtaining, with a computer system, a set of images compositable to depict different design configurations; providing, with the computer system, a first user interface by which members of the set are overlaid responsive to user inputs to depict different design configurations; obtaining, with the computer system, a first design configuration specified via the first user interface; and providing, with the computer system, the first user interface depicting a field of view depicting the first design configuration using a subset of the set of images.

16. The medium of embodiment 15, wherein the set of images includes a base image and at least one template image overlaid on top of the base image.

17. The medium of embodiment 16, wherein the at least one template image includes a first portion with pixels that are transparent such that, when overlaid on the base image, the pixels of the base image are still viewable, and wherein the at least one template image includes a second portion with pixels that are nontransparent and provide a design option for the first design configuration or the second design configuration such that, when overlaid on the base image, the pixels of the second portion occlude and overlay pixels in the base image to depict the design option.

18. The medium of embodiment 16, wherein a template image of the at least one template image includes a depth value that indicates a position of the template image in a stack of template images.

19. The medium of embodiment 16, wherein the base image and the at least one template image are stacked in a div box in a document object model.

20. The medium of embodiment 16, wherein the operations include steps for reducing edge artifacts in the at least one template image.

What is claimed is:

1. A tangible, non-transitory, machine-readable medium storing instructions that when executed by one or more processors effectuate operations comprising:
    obtaining, with a computer system, a plurality of images compositable to depict different design configurations;
    providing, with the computer system, a first user interface by which members of the plurality of images are overlaid responsive to user inputs to depict different design configurations;
    obtaining, with the computer system, a first design configuration specified via the first user interface that includes a first set of images of the plurality of images and a second design configuration that includes a second set of images of the plurality of images, wherein at least one first image of the first set of images:
        shares an object in the same position in pixel space with at least one second image of the second set of images, and
        includes a first design option for the object that is different than a second design option for the object in the at least one second image of the second set of images; and
    providing, with the computer system, a second user interface depicting a field of view having a first portion of the field of view depicting the first design configuration and a second portion of the field of view depicting the second design configuration, the second user interface being operative to adjust allocation in pixel space of the field of view between the first portion and the second portion responsive to user input such that adjustment of the allocation in the pixel space of the field of view displays a first portion of the object with the first design option simultaneously with a second portion of the object with the second design option.

2. The medium of claim 1, wherein the plurality of images includes a base image and at least one template image overlaid on top of the base image.

3. The medium of claim 2, wherein the base image depicts the field of view with at least a portion of an article of manufacture.

4. The medium of claim 2, wherein the at least one template image includes a first portion with pixels that are transparent such that, when overlaid on the base image, the pixels of the base image are still viewable, and wherein the at least one template image includes a second portion with pixels that are nontransparent and provide a design option for the first design configuration or the second design configuration such that, when overlaid on the base image, the pixels of the second portion occlude and overlay pixels in the base image to depict the design option.

5. The medium of claim 2, wherein a template image of the at least one template image includes a depth value that indicates a position of the template image in a stack of template images.

6. The medium of claim 2, wherein the base image and the at least one template image are stacked in a div box in a document object model.

7. The medium of claim 2, wherein the operations include steps for reducing edge artifacts in the at least one template image.

8. The medium of claim 1, wherein the second user interface includes a user interface element that splits the second user interface and is slidable to adjust the allocation in pixel space of the field of view between the first portion of the field of view and the second portion of the field of view responsive to the user input.

9. The medium of claim 8, wherein the user interface element is presented as animated sliding.

10. The medium of claim 8, wherein the user interface element is presented with an animated snap to a position corresponding to a predefined granular adjustment.

11. The medium of claim 1, wherein the adjusting the field of view between the first portion of the field of view and the second portion of the field of view responsive to the user input includes fading the first portion into the second portion by adjusting a transparency of the first portion.

12. The medium of claim 1, wherein the adjusting the field of view between the first portion of the field of view and the second portion of the field of view responsive to the user input includes a region that is movable by the user input such that the first portion is presented in the region and the second portion is presented outside the region.

13. The medium of claim 1, wherein the second user interface includes scripting language instructions that map an event handler to an element in a document object model of the second user interface that corresponds to the user input to make the adjustment.

14. The medium of claim 1, wherein the operations comprise steps for adjusting allocation in the pixel space of the field of view between the first portion and the second portion responsive to the user input.

15. The medium of claim 1, wherein the first portion of the object with the first design option occludes the first portion of the object with the second design option, and the second portion of the object with the second design option occludes the second portion of the object with the first design option.

16. A tangible, non-transitory, machine-readable medium storing instructions that when executed by one or more processors effectuate operations comprising:
  obtaining, with a computer system, a set of images compositable to depict different design configurations;
  providing, with the computer system, a first user interface by which members of the set are overlaid responsive to user inputs to depict different design configurations;
  obtaining, with the computer system, a first design configuration specified via the first user interface;
  providing, with the computer system, the first user interface depicting a field of view depicting the first design configuration using a subset of the set of images;
  generating, with the computer system using a hash function, a hash identifier for the first design configuration; and
  discarding, with the computer system, the first design configuration when the hash identifier matches a second hash identifier associated with a design configuration stored in a storage device.

17. The medium of claim 16, wherein the set of images includes a base image and at least one template image overlaid on top of the base image.

18. The medium of claim 17, wherein the at least one template image includes a first portion with pixels that are transparent such that, when overlaid on the base image, the pixels of the base image are still viewable, and wherein the at least one template image includes a second portion with pixels that are nontransparent and provide a design option for the first design configuration or the second design configuration such that, when overlaid on the base image, the pixels of the second portion occlude and overlay pixels in the base image to depict the design option.

19. The medium of claim 17, wherein a template image of the at least one template image includes a depth value that indicates a position of the template image in a stack of template images.

20. The medium of claim 17, wherein the operations include steps for reducing edge artifacts in the at least one template image.

* * * * *